(12) United States Patent
Roll et al.

(10) Patent No.: US 12,539,894 B2
(45) Date of Patent: Feb. 3, 2026

(54) FRAME STRUCTURE FOR VEHICLE

(71) Applicant: ALSTOM HOLDINGS, St Ouen sur Seine (FR)

(72) Inventors: Stéphane Roll, Brumath (FR); Bernard Tritz, Niederbronn les Bains (FR); Joël Samain, Obies (FR); Jérémy Keersbulik, La Jarne (FR)

(73) Assignee: ALSTOM HOLDINGS, Saint-Ouen-sur-Seine (FR)

( * ) Notice: Subject to any disclaimer, the term of this patent is extended or adjusted under 35 U.S.C. 154(b) by 838 days.

(21) Appl. No.: 17/805,826

(22) Filed: Jun. 7, 2022

(65) Prior Publication Data

US 2022/0396297 A1 Dec. 15, 2022

(30) Foreign Application Priority Data

Jun. 11, 2021 (FR) ...................................... 21 06170

(51) Int. Cl.
| | |
|---|---|
| *B61D 17/10* | (2006.01) |
| *B32B 15/01* | (2006.01) |
| *B32B 15/10* | (2006.01) |
| *B32B 21/04* | (2006.01) |
| *B61D 17/18* | (2006.01) |

(52) U.S. Cl.
CPC ............ *B61D 17/10* (2013.01); *B32B 15/012* (2013.01); *B32B 15/10* (2013.01); *B32B 21/04* (2013.01); *B61D 17/18* (2013.01)

(58) Field of Classification Search
CPC ........ B61D 17/10; B61D 17/18; B32B 21/04; B32B 15/012; B32B 15/10
See application file for complete search history.

(56) References Cited

U.S. PATENT DOCUMENTS

| | | | | |
|---|---|---|---|---|
| 2,565,292 | A * | 8/1951 | Arthur | B61D 17/10 |
| | | | | 108/57.14 |
| 6,318,275 | B1 * | 11/2001 | Basile | B61D 17/10 |
| | | | | 105/422 |
| 9,180,894 | B2 * | 11/2015 | Taguchi | B61D 17/18 |
| 9,233,694 | B2 * | 1/2016 | Kato | B61D 17/10 |
| 9,533,694 | B2 * | 1/2017 | Anderegg | B61D 27/0045 |
| 10,471,974 | B2 * | 11/2019 | Hirashima | B61D 17/10 |
| 2013/0112105 | A1 * | 5/2013 | Gregorits | B61D 17/10 |
| | | | | 105/422 |
| 2016/0362897 | A1 * | 12/2016 | S | B32B 3/266 |

FOREIGN PATENT DOCUMENTS

| | | | |
|---|---|---|---|
| AT | 12 884 U1 | 1/2013 | |
| CN | 111976762 A * | 11/2020 | ............ B32B 15/04 |
| DE | 94 10 972 U1 | 9/1994 | |

(Continued)

OTHER PUBLICATIONS

French Search Report issued for French Patent Application No. 21 06170, dated Feb. 28, 2022 in 2 pages.

*Primary Examiner* — Cheng Lin
(74) *Attorney, Agent, or Firm* — Knobbe, Martens, Olson & Bear, LLP

(57) ABSTRACT

A floor structure for a railway vehicle includes a composite panel. The panel includes a lower metal plate, an upper metal plate, and a layer of thermal insulating material arranged between the lower and upper metal plates. The layer of thermal insulating material includes a plate of wood or bark.

8 Claims, 5 Drawing Sheets

(56) References Cited

FOREIGN PATENT DOCUMENTS

| | | | |
|---|---|---|---|
| DE | 295 18 858 U1 | 2/1996 | |
| DE | 198 41 082 A1 | 3/2000 | |
| EP | 1508489 A2 * | 2/2005 | ............ B61D 17/10 |
| EP | 1787797 A1 | 5/2007 | |
| JP | 2000-52982 A | 2/2000 | |
| JP | 2013071469 A * | 4/2013 | |
| WO | 2012/010362 A1 | 1/2012 | |

* cited by examiner

FRAME STRUCTURE FOR VEHICLE

CROSS-REFERENCE TO RELATED APPLICATION

This application claims priority to French Patent Application No. 21 06170 filed on Jun. 11, 2021, the disclosure of which including the specification, the drawings, and the claims is hereby incorporated by reference in its entirety.

FIELD OF THE INVENTION

The present invention relates to an undercarriage structure for a vehicle, in particular a railway vehicle, of the type comprising a composite panel, said panel comprising a lower metal plate; an upper metal plate; and a layer of thermal insulating material, arranged between the lower and upper metal plates.

BACKGROUND OF THE INVENTION

A floor of a railway vehicle, such as a subway, must be resistant to fire and/or heat. In a conventional manner, as described in document EP2639132, a railway vehicle floor includes a structural panel, intended to support mechanical loads, under which a thermal insulation panel is arranged. The said panel includes a layer of thermal insulation, protected by a metal plate.

Such a configuration requires several superimposed levels, which increases the final weight and complicates the construction of the floor.

SUMMARY OF THE INVENTION

The purpose of the present invention is to propose a floor structure capable of supporting mechanical loads and including a heat protection, for an optimized weight and a significant reduction of the number of parts.

To this end, the invention has as its object a floor structure of the aforementioned type, wherein the layer of thermal insulating material comprises a panel of wood or bark.

According to further advantageous aspects of the invention, the floor structure includes one or more of the following features, taken alone or in any technically possible combination:
- the layer of thermal insulating material includes: a lower face, in contact with the lower metal plate; and an upper face, in contact with the upper metal plate, said layer being formed in one piece between said lower and upper faces;
- the wood or bark forming the layer is selected from balsa and cork;
- the upper metal plate is made of aluminum and the lower metal plate is made of steel;
- the composite panel presents an elongated shape according to a longitudinal direction, the structure further comprising rails connected to the lower metal plate, each rail extending according to the longitudinal direction and presenting a groove facing away from said metal plate;
- the composite panel presents a substantially rectangular outline, said structure further comprising a metal frame extending on said outline;
- the metal frame presents two substantially rectangular profiles extending according to the longitudinal direction, each of the profiles comprising an inner edge connected to the composite panel and an outer edge provided with means for connecting to the railway vehicle;
- the metal frame is made of aluminum or steel.

The invention further relates to an assembly comprising: a floor structure as described above; and two substantially straight bearers extending according to the longitudinal direction, each of said bearers being joined to the outer edge of a profile of the metal frame.

The invention further relates to a railway vehicle comprising an underframe and two side faces, said underframe comprising an assembly as described above, each of the two bearers being joined to one of the side faces.

BRIEF DESCRIPTION OF THE DRAWINGS

The invention will be better understood from the following description, given only as a non-limiting example and made with reference to the drawings in which.

DETAILED DESCRIPTION OF THE PREFERRED EMBODIMENTS

Figure 4:
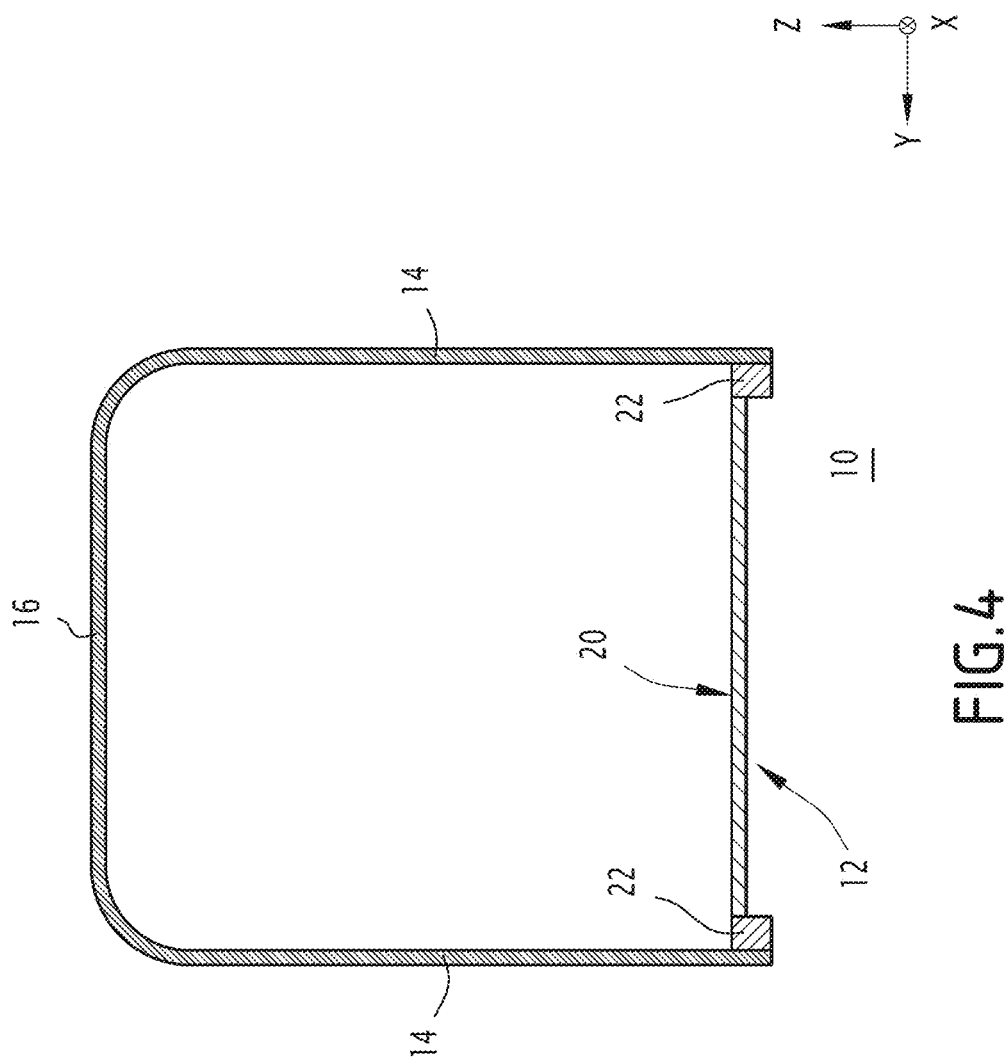
FIG. 4 is a schematic cross-sectional view of a railway vehicle comprising the assembly of FIG. 3.

FIG. 4 is a schematic view of a vehicle body 10, in particular a railway vehicle. The body 10 has a tubular shape extending according to a horizontal direction X, called longitudinal direction and corresponding to a direction of movement of the vehicle.

The body 10 includes in particular a frame 12, two side faces 14 and a roof 16.

Figure 5:
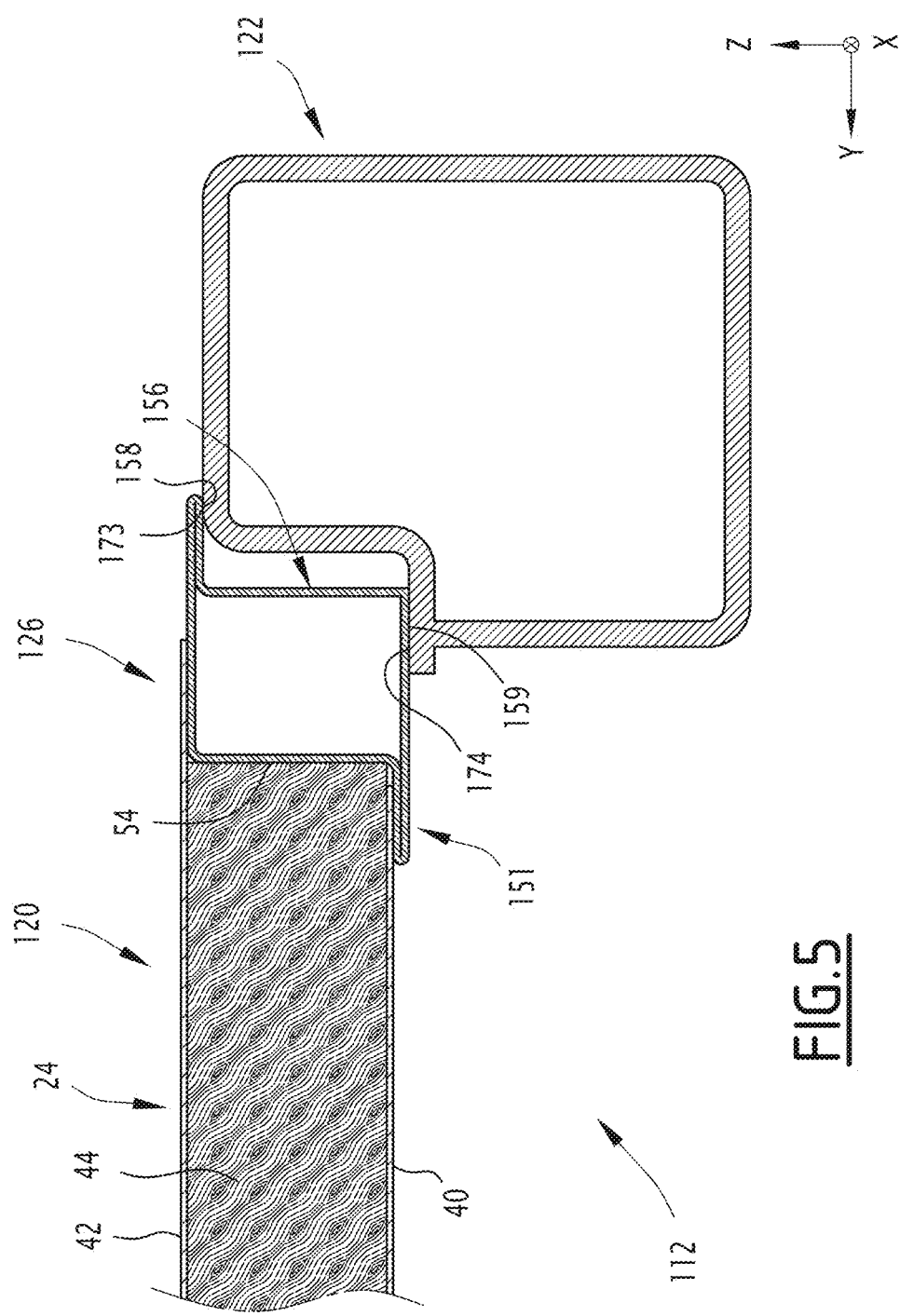
FIG. 5 is a detailed, cross-sectional view, of an assembly according to an alternative embodiment of FIG. 3.

FIG. 5 is a detailed view of a chassis 112, suitable for replacing the frame 12 in the body 10. In the following description, the frames 12 and chassis 112 will be described simultaneously, the common elements being designated by the same reference numbers.

An orthonormal base (X, Y, Z) is considered, with the Z direction representing the vertical.

In particular, the chassis 12, 112 includes a floor structure 20, 120 and two bearers 22, 122. Said bearers 22, 122 will be described in more detail later.

Figure 1:
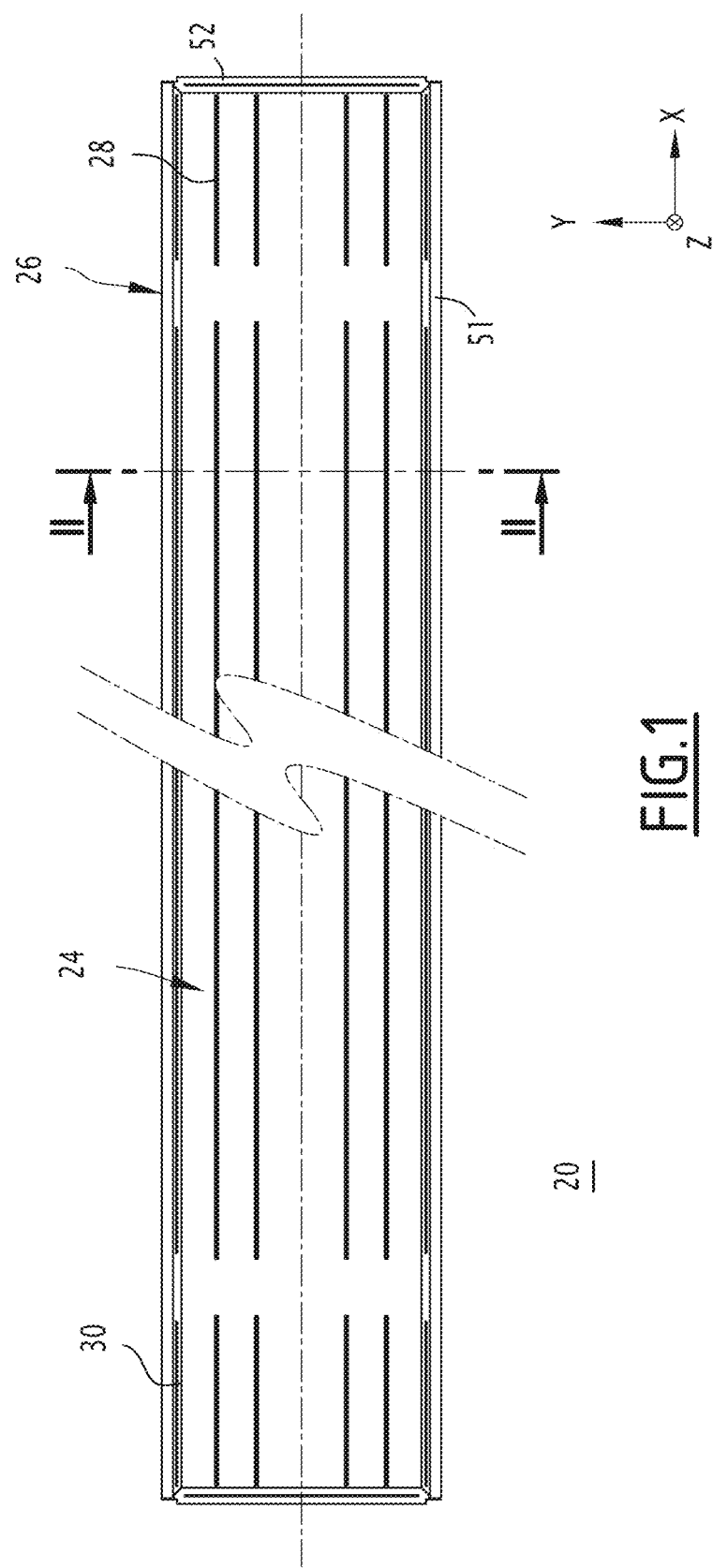
FIG. 1 is a view from below a floor structure according to one embodiment of the invention.
Figure 2:
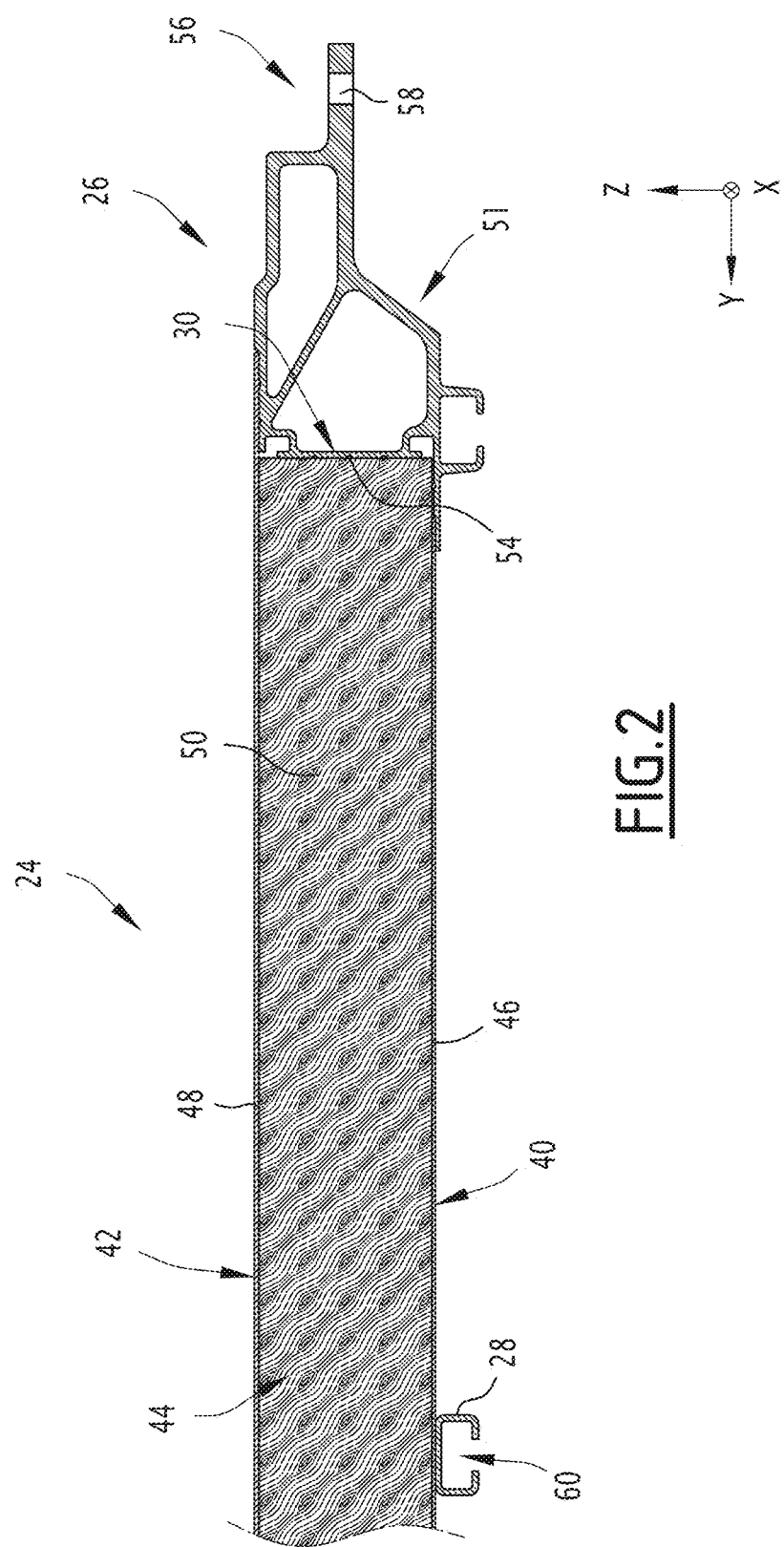
FIG. 2 is a detailed cross-sectional view, of the floor structure of FIG. 1.

FIGS. 1 and 2 represent a view from below and a cross-sectional view of the floor structure 20, respectively. A cross-sectional view of the floor structure 120 is visible in FIG. 5.

The floor structure 20, 120 includes a sandwich panel 24, also referred to as a composite panel 24, a frame 26, 126 and rails 28.

The panel 24 is parallel to a (X, Y) plane. Said panel 24 presents a rectangular outline 30, elongated according to the direction X. As an indication, a length of the panel 24 according to X is in the range of 5 to 20 meters; and a width of said panel according to Y is in the range of 2 to 3 meters.

As seen in FIGS. 2 and 5, the composite panel 24 includes a lower metal plate 40, an upper metal plate 42, and a layer 44 of thermal and structural insulating material, arranged according to Z between the lower 40 and upper 42 metal plates.

The layer 44 includes a lower face 46 and an upper face 48, each of said faces being arranged in a plane (X, Y). Preferably, the lower face 46 is in contact with the lower metal plate 40 and the upper face 48 is in contact with the upper metal plate 42.

As an indication, a thickness of the layer 44 according to Z, between the lower 46 and upper 48 faces, is in the range of 30 to 150 mm, more preferably in the range of 40 to 100 mm.

According to one preferred embodiment, the layer 44 is formed in one piece according to Z, between the lower 46 and upper 48 faces. More preferably, between said lower 46 and upper 48 faces, the layer 44 is formed of a panel 50 of wood or bark or foam.

The panel 50 is selected to be sufficiently rigid to support mechanical loads corresponding to elements received within the vehicle body 10.

Preferably, the panel 50 is a balsa panel, which provides good rigidity combined with low weight and good thermal resistance. Alternatively, the panel 50 is a cork panel, which has a better thermal resistance but a higher density.

The layer 44 of the composite panel 24 is not necessarily one-piece in the X and Y directions. For example, the layer 44 comprises a plurality of substantially identical panels 50 joined together in one plane (X, Y).

According to one alternative embodiment not shown, the layer 44 is formed of several panels stacked according to Z, for example a balsa panel and a sheet of cork.

The lower metal plate 40, facing the outside of the vehicle body 10, is preferably made of steel or stainless steel to provide better heat protection. On the other hand, the upper metal plate 42, facing the interior of the body 10, is preferably made of aluminum to limit the weight of the structure 20.

Each lower metal plate 40 or upper metal plate 42 preferably presents a thickness according to Z of between 1 mm and 5 mm, more preferably between 1.5 mm and 2 mm.

Preferably, the layer 44 is bonded to the lower 40 and upper 42 metal plates. More preferably, the adhesive used is a ceramic adhesive capable of withstanding high temperatures, for example of the order of 600° C. to 1200° C. Such an adhesive is, for example, the refractory adhesive marketed under the name Pyrofeu.

According to one embodiment, the layer 44 is assembled by bonding with the upper sheet by means of structural adhesive and with the lower sheet 40 by means of a ceramic adhesive.

In the case where the layer 44 comprises several panels 50 of wood or bark assembled in a plane (X, Y), said panels 50 are preferably bonded to each other by such an adhesive capable of withstanding high temperatures.

The frame 26 of the structure 20 includes two longitudinal profiles 51 and two transverse profiles 52, assembled to the contour 30 of the panel 24 and arranged according to the X and Y directions respectively. FIG. 2 shows a cross-sectional view of one longitudinal profile 51.

Similarly, the frame 126 of the structure 120 includes two longitudinal profiles 151 (FIG. 5) and two transverse profiles, not shown.

Each profile 51, 151, 52 presents a straight rectangular shape and a substantially constant cross-section, allowing fabrication by metal extrusion.

The longitudinal profiles 51 and transverse profiles 52 of the frame 26 are preferably made of aluminum. The longitudinal 151 and transverse profiles of the frame 126 are preferably made of steel.

Each profile 51, 151, 52 presents an inner edge 54 and an outer edge 56, 156. The inner edge 54 is bonded to the composite panel 24, for example by gluing with the adhesive described above.

The outer edge 56, 156 is provided with a means for joining to the rest of the vehicle body 10.

Figure 3:
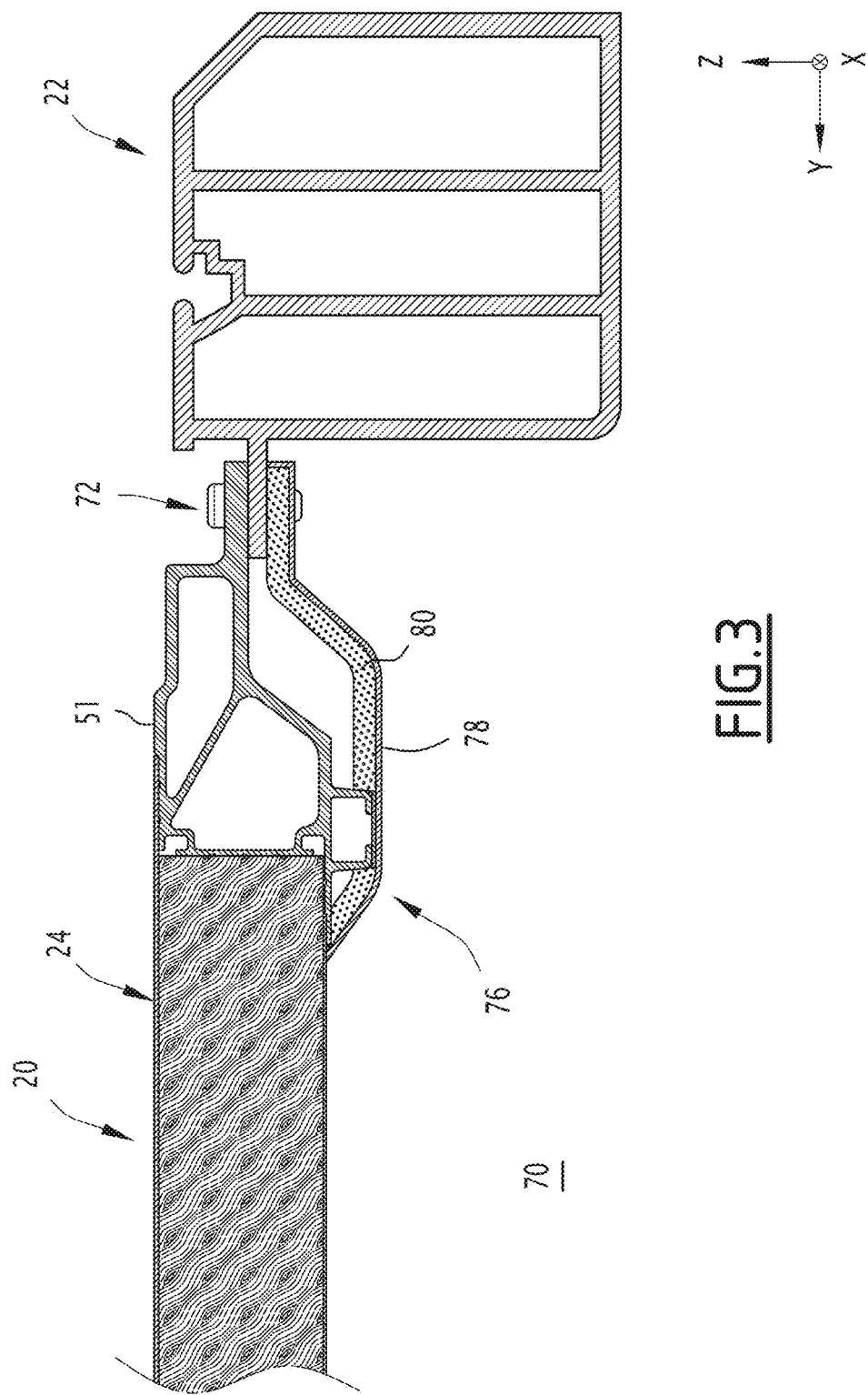
FIG. 3 is a detailed cross-sectional view of an assembly comprising the floor structure of FIGS. 1 and 2.

In the embodiment shown in FIGS. 1 to 3, the assembly means includes riveting. In particular, the outer edge 56 of each longitudinal profile 51 presents in the form of a horizontal blade, including a series of through holes 58 aligned according to X.

In the embodiment shown in FIG. 5, the assembly means includes welding. In particular, the outer edge 156 of each longitudinal profile 151 includes at least one welding zone 158, 159, and preferably at least two welding zones. Each welding zone 158, 159 is in the form of a strip extending according to X.

The rails 28 are attached to the lower metal plate 40, opposite the layer 44 of thermal insulating material. Each rail extends substantially according to X and presents a C-shaped cross-section, forming a downwardly facing groove 60. The rails 28 are preferably made of steel.

The rails 28 are intended in particular for fixing light elements, such as cabling trays or piping.

FIG. 3 represents an assembly 70 constituting a manufacturing step of the railway vehicle body 10 of FIG. 4.

In particular, the assembly 70 includes the structure 20 of FIGS. 1 and 2 and the two bearers 22. In addition, as noted above, the chassis 112 shown in FIG. 5 includes the previously described floor structure 120 and the two bearers 122. The assembly 70 and the chassis 112 will be described simultaneously below.

Each bearer 22, 122 presents a rectangular, tubular shape, extending according to X. Each bearer 22, 122 presents a substantially constant cross-section.

Preferably, the bearer 22, 122 is made of aluminum or steel.

Each bearer 22, 122 is attached to the outer edge 56, 156 of one of the longitudinal profiles 51, 151 of the structure 20, 120.

In the embodiment of FIG. 3, the assembly 70 includes rivets 72 arranged in the through holes 58 of the outer edge 56 and connecting said outer edge and the corresponding bearer to each other.

In the embodiment shown in FIG. 5, each bearer 122 includes at least one welding surface 173, 174, and preferably at least two welding surfaces. Each welding surface 173, 174 presents in the form of a strip extending according to X. Each welding surface 173, 174 is welded to one of the welding zones 158, 159 of the outer edge 156 of each longitudinal profile 151.

Preferably, in the embodiment shown in FIG. 3, the assembly 70 further includes two thermal protection strips 76, each strip being arranged underneath a longitudinal profile 51 and under the interfaces between said profile, the composite panel 24 and the bearer 22. Each strip 76, fixed to the rest of the assembly 70, includes, for example, a stainless-steel plate 78 topped by a layer of rock wool type insulation 80.

This thermal protection is also applied to the transverse profile 52.

A manufacturing method for the structure 20 will now be described. The upper metal plate 42 is placed on a work surface, the side facing upwards is coated with ceramic glue. Rectangular shaped balsa panels 50 are then arranged edge to edge on said top metal plate 42. The interfaces between the panels 50 are glued before assembly.

The layer 44 of thermal insulating material is thus formed, with a lower face 46 facing upwards. Said lower face is then coated with ceramic glue and assembled to the lower metal plate 40.

After the glue has dried, the composite panel 24 thus obtained is assembled to the profiles 51, 52 of the frame 26 and the rails 28 are glued to the lower metal plate 40.

The profiles 51 and 52 of the frame 26 can also be assembled in the previous steps.

The floor structure 120 is manufactured by a similar process.

Such a structure 20, 120 presents good fire and heat resistance, combined with an optimized weight. The lower metal plate 40, made of steel, avoids the contact of flames with the thermal insulation, of balsa type, of the layer 44. This layer limits heat conduction to the upper metal plate 40, preferably made of aluminum. In addition, the choice of material for layer 44 allows the floor to support the mechanical loads applied to the interior of the railway vehicle body 10, without the need to weigh down the floor by adding a supporting structure.

What is claimed is:

1. An assembly comprising:
   a floor structure for a vehicle, wherein the floor structure comprises a composite panel having a substantially rectangular outline; and
   two substantially straight bearers extending in the longitudinal direction, each of said two substantially straight bearers being joined to the outer edge of a profile of the metal frame,
   wherein the floor structure comprises:
      a lower metal plate;
      an upper metal plate; and
      a layer of thermal insulating material arranged between the lower and upper metal plates, the layer of thermal insulating material comprising a panel of wood or bark; and
      a metal frame extending on said substantially rectangular outline, wherein the metal frame is made of aluminum or steel,
   wherein the upper metal plate is aluminum, and the lower metal plate is steel.

2. The assembly according to claim 1, wherein the layer of thermal insulating material includes:
   a lower face, in contact with the lower metal plate; and
   an upper face, in contact with the upper metal plate,
   said layer being integrally formed between said lower and upper faces.

3. The assembly according to claim 1, wherein the wood or bark forming the panel is selected from the group consisting of balsa and cork.

4. The assembly according to claim 1, wherein the composite panel has an elongated shape according to a longitudinal direction, the structure further comprising rails assembled to the lower metal plate, each rail extending according to the longitudinal direction and presenting a groove facing away from said lower metal plate.

5. The assembly according to claim 1, wherein the composite panel has an elongated shape according to a longitudinal direction, the structure further comprising rails assembled to the lower metal plate, each rail extending according to the longitudinal direction and presenting a groove facing away from said metal plate, and
   wherein the metal frame presents two substantially rectangular profiles extending according to the longitudinal direction, each of the profiles comprising an inner edge connected to the composite panel and an outer edge provided with means for connecting the railway vehicle.

6. A railway vehicle comprising a chassis and two side faces, said chassis comprising the assembly according to claim 1, each of the two bearers being assembled to one of the side faces.

7. An assembly comprising:
   a floor structure for a vehicle, wherein the floor structure comprises a composite panel having a substantially rectangular outline; and
   two substantially straight bearers extending in the longitudinal direction, each of said two substantially straight bearers being joined to the outer edge of a profile of the metal frame,
   wherein the floor structure comprises:
      a lower metal plate;
      an upper metal plate;
      a layer of thermal insulating material arranged between the lower and upper metal plates, the layer of thermal insulating material comprising a panel of wood or bark; and
      a metal frame extending on said substantially rectangular outline,
   wherein the upper metal plate is aluminum, and the lower metal plate is steel,
   wherein the composite panel has an elongated shape according to a longitudinal direction, the floor structure further comprising rails assembled to the lower metal plate, each rail extending according to the longitudinal direction and presenting a groove facing away from said metal plate, and
   wherein the metal frame presents two substantially rectangular profiles extending according to the longitudinal direction, each of the profiles comprising an inner edge connected to the composite panel and an outer edge provided with means for connecting the railway vehicle.

8. A railway vehicle comprising a chassis and two side faces, said chassis comprising the assembly according to claim 7, each of the two bearers being assembled to one of the side faces.

* * * * *